United States Patent [19]

Uurtamo

[11] Patent Number: 4,642,642

[45] Date of Patent: Feb. 10, 1987

[54] ADAPTIVE MONOPULSE PHASE/AMPLITUDE CALIBRATION CORRECTION SYSTEM

[75] Inventor: Stephen J. Uurtamo, Scottsdale, Ariz.

[73] Assignee: Motorola, Inc., Schaumburg, Ill.

[21] Appl. No.: 665,897

[22] Filed: Oct. 29, 1984

[51] Int. Cl.$^4$ .............................................. G01S 7/40
[52] U.S. Cl. ..................................................... 343/165
[58] Field of Search ................... 343/17.7, 16 M, 417, 343/420, 421, 427, 703, 55 W, 7 AG

[56] References Cited

U.S. PATENT DOCUMENTS 3,229,289  1/1966  Stine .................................... 343/17.7
4,348,676  9/1982  Tom ................................ 343/17.7 X Primary Examiner—T. H. Tubbesing
Assistant Examiner—Gilberto Barrón, Jr.
Attorney, Agent, or Firm—Eugene A. Parsons

[57] ABSTRACT

A monopulse antenna system providing a pair of phase-/amplitude related signals in response to the reception of a desire signal, having calibration correction means attached thereto which receive one of the output signals from the antenna system and produce a pair of output signals having equal amplitude and a 90 degree phase difference. The calibration correction circuitry supplies the pair of output signals to the two channels of the monopulse receiver which includes circuitry for comparing the amplitude of signals in each of the channels and standard monopulse circuitry which compares the phase of signals in the two channels. Gain and phase adjustments in at least one of the channels are adjusted in response to the pair of signals until the compared output signals are equal in amplitude and 90 degrees apart in phase.

11 Claims, 2 Drawing Figures

ADAPTIVE MONOPULSE PHASE/AMPLITUDE CALIBRATION CORRECTION SYSTEM

BACKGROUND OF THE INVENTION

The present invention pertains to apparatus and a method of correcting a phase/amplitude calibration in an adaptive monopulse system. While there are a variety of monopulse systems known in the art and it is anticipated that the present invention will operate on any of these systems, the present invention is disclosed primarily in conjunction with an adaptive monopulse system including phase/amplitude calibration circuitry and a receiver including dual channels providing elevation and azimuth output signals in response to a single input signal.

Monopulse systems generally include a rather complicated antenna and beam forming network which receive the single signal and generate a pair of output signals having relative amplitudes and phases that are dependent upon the direction of the received signal with respect to the monopulse system. The pair of signals are supplied to a two channel receiver which is pre-calibrated to provide elevation and azimuth output signals in response to the pair of input signals. Whenever a different receiver is substituted, or the operating frequencies are changed, the system must be recalibrated in a rather lengthy procedure. Generally, the system will be calibrated over an entire band of frequencies which further limits the accuracy at a specific frequency because the calibration is generally designed to provide the best results over the entire band.

SUMMARY OF THE INVENTION

The present invention pertains to a phase/amplitude calibration correction system for an adaptive monopulse system including antenna apparatus providing a pair of monopulse output signals in response to the reception of a remotely transmitted signal, a receiver having two channels and phase/amplitude calibration apparatus, and correction means coupling the antenna apparatus to the receiver and amplitude comparing circuitry coupled between the channels providing an output indicative of amplitude balance. The correction means utilizes one of the pair of signals from the antenna apparatus to provide two equal amplitude, 90 degree out of phase signals which are coupled to the receiver in a calibration mode of operation. The relative phase and gain of the two channels is then adjusted until the relative phase between the output signals in the receiver channels are 90 degrees out of phase and the amplitudes are equal. The correction apparatus is then switched so that both of the pairs of monopulse output signals from the antenna apparatus are applied to the receiver. Through this apparatus and method the receiver is calibrated for the specific signal it is desired to receive.

It is an object of the present invention to provide new and improved phase/amplitude calibration correction apparatus for use in an adaptive monopulse system.

It is a further object of the present invention to provide phase/amplitude calibration correction apparatus which calibrates a monopulse receiver at the frequency it is desired to receive.

It is a further object of the present invention to provide new and improved phase/amplitude calibration correction apparatus which can correct the calibration of a monopulse receiver in the field with little or no effort on the part of the operator.

These and other objects of this invention will become apparent to those skilled in the art upon consideration of the accompanying specification, claims and drawing.

BRIEF DESCRIPTION OF THE DRAWING

Referring to the drawings.

DESCRIPTION OF THE PREFERRED EMBODIMENT

Figure 1A:
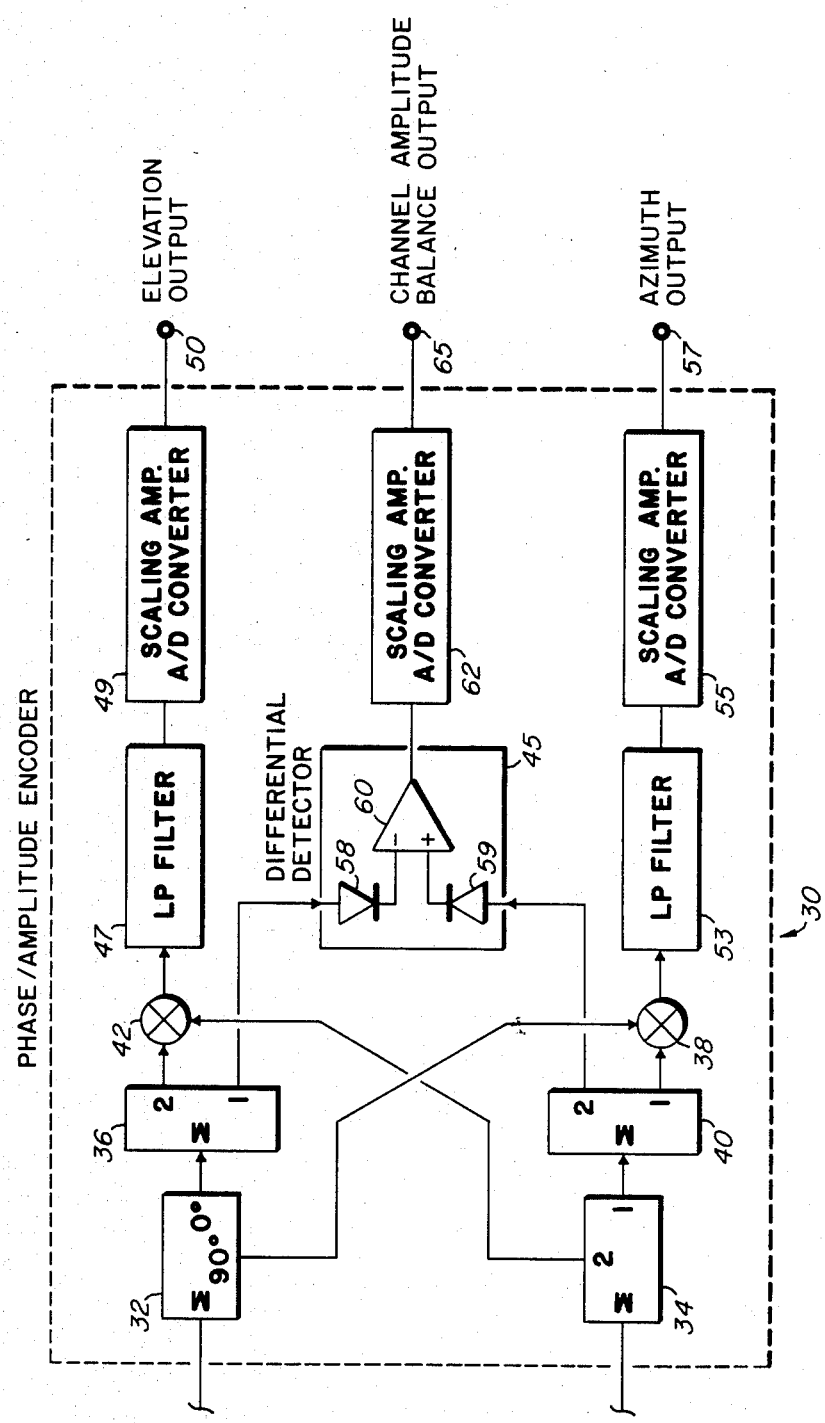
FIG. 1A and 1B illustrate a block diagram of an adaptive monopulse system including phase/amplitude calibration apparatus incorporating the present invention.
Figure 1B:
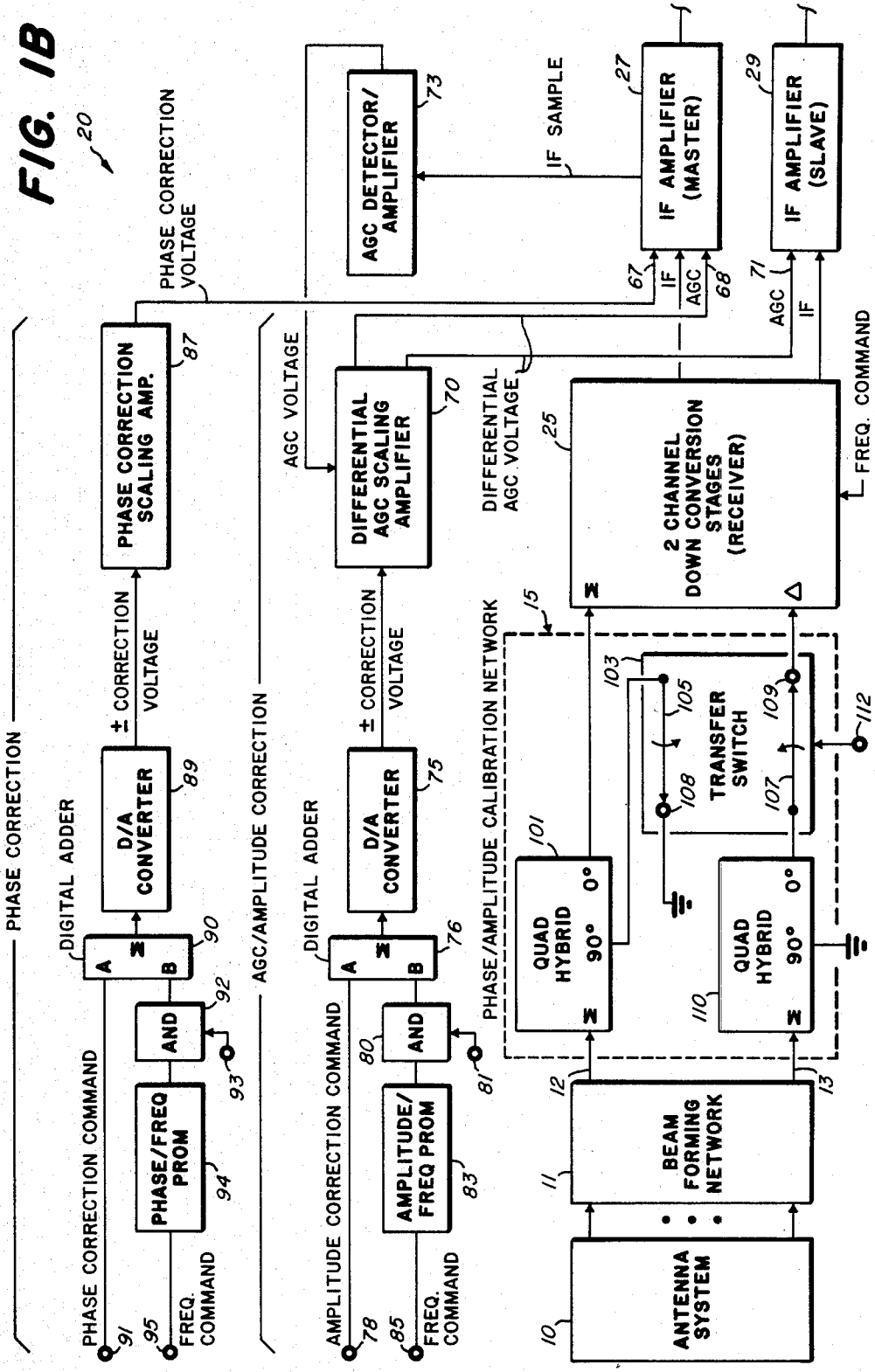

Referring specifically to the figures, the numeral 10 designates a monopulse antenna system having a beam forming network 11 attached thereto. Typical monopulse antenna systems are illustrated in U.S. Pat. No. 3,990,078, entitled "Image Element Antenna Array for a Monopulse Tracking System for a Missile" issued Nov. 2, 1976 and U.S. Pat. No. 4,309,706, entitled "Wideband Direction-Finding System", issued Jan. 5, 1982. Since the antenna system antenna and beam forming network 11 are well-known in the art, a detailed description of the construction and operation thereof will not be set forth herein.

The beam forming network 11 provides a pair of monopulse output signals on a pair of output terminals 12 and 13. As is well-known in the art, the pair of output signals on terminals 12 and 13 are provided in response to a single input signal and the relative phase and amplitude of the pair of signals is indicative of the direction (elevation and azimuth) of the received signal. Terminals 12 and 13 are connected through calibration correction circuitry, generally designated 15, to two inputs of a two channel receiver generally designated 20. Receiver 20 includes a block 25 having down conversion stages therein, IF amplifier stages 27 and 29 (one in each channel) and a phase/amplitude encoder generally designated 30. The upper channel in block 25 is the sum channel, which is connected through IF amplifier 27 to the input of a quadrature hybrid 32 in encoder 30. The lower channel in block 25 is the difference channel, which is connected though IF amplifier 29 to an input of a power divider 34 in encoder 30. A zero degree phase shifted output of hybrid circuit 32 is supplied to an input of a power divider 36 and a 90 degree phase shifted output is supplied to one input of a mixer 38. A first output of power divider 34 is supplied to an output of a second power divider 40 and a second output of power divider 34 is connected to a first input of a mixer 42. A first output of power divider 36 is connected to a second input of mixer 42 and a second output is connected to an input of a differential detector 45. A first output of power divider 40 is connected to a second input of mixer 38 and a second output is connected to a second input of differential detector 45. An output of mixer 42 is connected through a low pass filter 47 and a scaling amplifier analog to digital converter 49 to an output terminal 50. The signal at output terminal 50 is representative of the elevation direction of the received signal. An output of mixer 38 is supplied through a low pass filter 53 and a scaling amplifier analog to digital converter 55 to an output terminal 57. Terminal 57 has a signal thereon which is representative of the azimuth direction of the received signal. The two inputs to differential detector 45 are connected through diodes 58 and 59, respectively, to negative and positive inputs, respectively, of a differential amplifier 60. An output of differential amplifier 60 is supplied through a scaling amplifier and analog to digital converter 62 to an output terminal 65. Output terminal 65 has a signal thereon which is representative of the balance between the amplitudes in signals carried in the two channels. Since the differential amplifier 60 substracts signals in the upper summation channel from signals in the lower differential channel, if the amplitudes of the signals in the two channels are equal a null will appear at terminal 65.

IF amplifier 27 includes an input 67 having a phase correction voltage applied thereto. IF amplifier 27 includes a varactor tuned delay line connected to adjust the phase of signals supplied to IF amplifier 27. The voltage supplied to input 67 causes the varactor to alter the tuning of the delay line so that the phase of signals in IF amplifier 27 are adjusted with respect to the phase of signals in IF amplifier 29. IF amplifier 27 also has an input 68 connected to receive an AGC voltage thereon from an output of a differential AGC scaling amplifier 70. IF amplifier 29 also has an AGC input 71 connected to an output of amplifier 70. Differential AGC scaling amplifier 70 adjusts the gain of IF amplifiers 27 and 29 in two different ways. First, amplifier 70 adjusts the AGC voltage supplied to IF amplifiers 27 and 29 both in the same direction to supply a normal AGC action. Second, the AGC voltage supplied to terminal 68 and 71 of IF amplifiers 27 and 29 may be adjusted differentially by amplifier 70 so that the gain of either amplifier 27 or 29 is increased over the other amplifier to compensate for differences in gain in one or the other of the channels in receiver 20.

A sample of the IF signal in amplifier 27 is supplied to an AGC detector/amplifier 73, which provides an output to differential AGC scaling amplifier 70 to control normal AGC actions. A second signal is received by amplifier 70 from a digital to analog converter 75. This second signal is a correction voltage which causes the differential AGC voltages to be supplied to amplifiers 27 and 29. Converter 75 receives a sum signal from a digital adder 76 having two inputs supplied thereto. A first input to adder 76 is an amplitude correction command received on a terminal 78. The amplitude correction command may be manually supplied in response to a determination that the amplitudes of the two channels in receiver 20 are not balanced, or a microprocessor or the like may be utilized to close the circuit between output terminal 65, having a channel amplitude balance output signal thereon, and input terminal 78.

A second input to adder 76 is connected to an output of an AND gate 80. AND gate 80 is connected to operate as a switch with one input connected to a terminal 81 designed to receive a high signal in the operate mode and a low signal in the calibrate mode. A second input of AND gate 80 is connected to a programmable read only memory (PROM) 83 containing amplitude/frequency information therein. PROM 83 has an input connected to a terminal 85 adapted to receive frequency commands thereon. Thus, when receiver 20 is tuned to a specific frequency a command corresponding to that frequency is supplied to terminal 85. This command causes PROM 83 to supply calibration information to AND gate 80. In the operate mode, this calibration information is supplied to adder 76 where it is added to any amplitude correction commands appearing at terminal 78. These combined signals are converted to an analog voltage in converter 75 and supplied to the correction voltage input of amplifier 70 where they are converted to a differential AGC signal and supplied to IF amplifiers 27 and 29.

Phase correction input 67 of IF amplifier 27 is connected to the output of a phase correction scaling amplifier 87 which in turn receives a correction voltage input from a digital to analog converter 89. An input of converter 89 is connected to an output of a digital adder 90 having two inputs. A first input of adder 90 is connected to a terminal 91 adapted to receive a phase correction command thereon, which command may be supplied manually or through a microprocessor, etc., not shown (as described above). A second input of adder 90 is connected to an output of an AND gate 92 connected to operate as a switch. A first input of AND gate 92 is connected to a terminal 93 adapted to receive a high "operate" signal thereon or a low "calibrate" signal thereon. In the second input AND gate 90 is connected to a phase/frequency PROM 94. An input of PROM 94 is connected to a terminal 95 adapted to receive a frequency command thereon similar to the command received on terminal 85. PROM 94 contains phase calibration information for each of the frequencies of operation of receiver 20, which information is added to (in the operate mode) phase correction commands supplied to terminal 91. The sum signal is converted to an analog voltage in converter 89 and supplied, through amplifier 87 to phase correction input 67 if IF amplifier 27.

The phase and amplitude information stored in PROMS 94 and 83, respectively, is calibration information which is predetermined, when used with a specific antenna system 10 and beam forming network 11 independent of a specific receiver 20. However, when a different receiver is utilized, because of failures, changes in bands of frequencies, etc., the calibration information may not be adequate to balance the two channels. In prior art devices it is necessary to change the calibration information in PROMS 94 and 83 when this situation arises. However, because of the present invention, the phase and amplitude correction commands can be applied to terminals 91 and 78 to balance the two channels in receiver 20.

The phase/amplitude calibration network 15 includes phase shifting apparatus, which in this embodiment is a quadrature hybrid circuit 101. Quadrature hybrid circuit 101 has an input connected to output 12 of beam forming network 11, a zero degree phase shifted output connected to the sum (upper) channel of block 25 and a 90 degree phase shifted output connected to an input of a switch 103. Switch 103 may be, for example, a transfer switch operable at the frequencies of interest. Switch 103 is essentially a double pole double throw switch having two moveable connectors 105 and 107 each engaged with an opposite one of a pair of contacts 108 and 109. In the operate mode, the 90 degree phase shifted output of hybrid 101 is connected to connector 105 which is in turn engaged with contact 108. Contact 108 is connected to a ground or other means of dissipating the signal. Connector 107 is engaged with contact 109 which is in turn connected to the difference channel input (lower input) of block 25. Connector 107 is connected to the zero degree phase shifted output of a hybrid circuit 110, the input of which is connected to output 13 of beam forming network 11. Thus, signals on output 13 are supplied through hybrid 110 and switch 103 directly to the difference input of receiver 20. Hybrid 110 is similar to hybrid 101 and is provided in the circuit so that the channels are symetrical.

Switch 103 also has an actuating input supplied at a terminal 112. In the operate mode, a low level signal is applied to terminal 112 and the 2 connecters 105 and 107 assume the position described above. In the calibrate mode, a high level signal is supplied to terminal 112 and connector 105 is moved into engagement with contact 109 and connector 107 is moved into engagement with contact 108. In this mode of operation the signal from hybrid network 110 is terminated by the termination connected to contact 108 and the 90 degree phase shifted signal from hybrid network 101 is supplied to the difference channel input of receiver 20. Thus, the signals supplied to the inputs of receiver 20 are both developed from the output signal at output terminal 12 of beam forming network 11. Since both signals are developed from a common input signal, they are substantially the same amplitude and 90 degrees separated in phase. The reference or sum signal is utilized as the single input signal because it is a larger signal and, therefore, easier to use. However, it will be understood by those skilled in the art that the difference signal might be utilized if desired. Because the two signals supplied to the inputs of receiver 20 are substantially identical in amplitude, the signal available at terminal 65 should be a null. However, any unbalanced or improper calibration between the two channels will cause an unbalanced signal to appear at terminal 65. Thus, with the system in the calibrate mode, amplitude correction commands are supplied to input terminal 78 until a null is detected at output terminal 65. As described previously, these amplitude correction commands may be supplied automatically to input terminal 78 through the use of a microprocessor chip or the like connected to receive signals from the output terminal 65.

With the signal supplied to the 2 inputs of receiver 20 being separated by substantially 90 degrees in phase, the azimuth output signal at terminal 57 should be a null. However, because of differences in the channels or improper calibration some signal other than a null may appear at output terminal 57. In this instance, phase correction commands are applied to input terminal 91 until the phase of IF amplifier 27 is adjusted sufficiently to null the signal at output terminal 57. With the signals at output terminals 57 and 65 both at a null, the system is switched to the operate mode in which both of the pair of output signals from beam forming network 11 are supplied to the two inputs of receiver 20. Thus, receiver 20 is calibrated at the exact frequency of operation with little or no effort on the part of the operator. In fact, as described previously, the calibration can be achieved automatically through the use of programmable circuitry such as a microprocessor or the like. The microprocessor can be connected to provide the calibrate/operate switching so that the entire calibration step is performed automatically and rapidly upon reception of a desired signal.

Thus, an improved adaptive Monopulse Phase/Amplitude Calibration Correction system is disclosed which is capable of operating with or without human input and which greatly simplifies the calibration of adaptive monopulse systems. It will, of course, be understood by those skilled in the art that the predetermined calibration stored in PROMS 83 and 94 could be eliminated and the complete calibration step can be performed by the circuitry connected between output terminals 57 and 65 and input terminals 78 and 91. Further, while a 90 degree, or quadrature hybrid, is disclosed in the present embodiment, it will be recognized by those skilled in the art that other phase shift or might be utilized to arrive at specific known outputs on terminals 50 or 57.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:

1. An adaptive monopulse phase/amplitude calibration correction system comprising:

antenna apparatus providing a pair of monopulse output signals in response to the reception of a remotely transmitted signal;

receiver means, including phase/amplitude calibration apparatus, having two signal inputs; and correction means coupled to said antenna apparatus and said receiver means for coupling the pair of monopulse output signals of said antenna apparatus to the two inputs of said receiver means in an operate mode, and phase shifting one of the pair of monopulse output signals to produce two equal amplitude, out-of-phase signals from the one of the pair and supplying the two signals to the two inputs of said receiver means in a calibration correction mode.

2. An adaptive monopulse phase/amplitude calibration correction system as claimed in claim 1 wherein the antenna apparatus includes a monopulse antenna system and a beam forming network coupled thereto.

3. An adaptive monopulse phase/amplitude calibration correction system as claimed in claim 1 wherein the correction means includes a phase shifting network having a single input coupled to receive one of the pair of monopulse output signals and two out-of-phase output signals one of which is coupled to one of the inputs of the receiver means, and a switching network connected to supply the other of the pair of monopulse output signals to the other of the inputs of the receive means in the operate mode and to supply the other of the two out-of-phase output signals to the other of the input of the receiver means in the calibration correction mode.

4. An adaptive monopulse phase/amplitude calibration correction system as claimed in claim 3 wherein the phase shifting network is a quadrature hybrid device providing 0° and 90° phase shifted signals at the outputs thereof.

5. An adaptive monopulse phase/amplitude calibration correction system as claimed in claim 4 wherein a second quadrature hybrid device is used to connect the other of the pair of monopulse output signals to the switching network with no phase shift to balance the pair of monopulse output signals.

6. An adaptive monopulse phase/amplitude calibration correction system as claimed in claim 1 wherein the receiver means includes a pair of channels and means connected to both of the pair of channels for providing an output indicative of the amplitude balance between the pair of channels.

7. An adaptive monopulse phase/amplitude calibration correction system as claimed in claim 6 wherein the means connected to both of the pair of channels includes a differential amplifier.

8. An adaptive monopulse phase/amplitude calibration correction system as claimed in claim 6 wherein each of the pair of channels includes an amplifier having an adjustable automatic gain control.

9. An adaptive monopulse phase/amplitude calibration correction system as claimed in claim 8 wherein one of the amplifiers includes a varactor tuned line for adjusting the phase of the one amplifier with respect to the other amplifier.

10. An adaptive monopulse phase/amplitude calibration correction system comprising:

antenna apparatus providing a pair of monopulse output signals in response to the reception of a remotely transmitted signal;

receiver means, including phase/amplitude calibration apparatus, having two signal inputs, said receiver means including two signal channels with said calibration apparatus including amplifying means in at least one of said channels with adjustable phase and gain, and a differential amplifier connected between said channels to provide an output signal indicative of a difference in signal amplitude therebetween;

correction means coupled to said antenna apparatus and said receiver means for coupling the pair of monopulse output signals of said antenna apparatus to the two inputs of said receiver means in an operate mode, and phase shifting one of the pair of monopulse output signals to produce two equal amplitude, out-of-phase signals from the one of the pair and supplying the two out-of-phase signals to the two inputs of said receiver means in a calibration correction mode.

11. A method of phase/amplitude calibration correction in an adaptive monopulse system comprising the steps of:

receiving a desired signal in an antenna system and beam forming network portion of the monopulse system, said portion of the monopulse system supplying a pair of output signals in response to the reception of the desired signal;

connecting one of the pair of output signals, unchanged in phase, to one input of a receiver having dual channels and an input for each channel;

shifting the phase of the one output signal, by approximately 90° and connecting it to the second input of the receiver;

adjusting phase and amplitude of at least one of the dual channels until an output indicative of azimuth angle is at a null and an output indicative of the difference in amplitude between the dual channels is at a null; and disconnecting the phase shifted one output signal from the second input of the receiver and connecting the other of the pair of output signals to the second input.

* * * * *